(12) United States Patent
Doi et al.

(10) Patent No.: US 6,886,804 B2
(45) Date of Patent: May 3, 2005

(54) SOCKET FOR PIPE COUPLING

(75) Inventors: Takahiro Doi, Tokyo (JP); Takeya Sasa, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 177 days.

(21) Appl. No.: 10/365,919

(22) Filed: Feb. 13, 2003

(65) Prior Publication Data

US 2003/0151015 A1 Aug. 14, 2003

(30) Foreign Application Priority Data

Feb. 14, 2002 (JP) ........................................ 2002-036928

(51) Int. Cl.[7] ............................ F16L 29/00; F16L 37/28
(52) U.S. Cl. ................................. 251/149.6; 251/149.1
(58) Field of Search ................................ 251/149–149.7

(56) References Cited

U.S. PATENT DOCUMENTS

| | | | | |
|---|---|---|---|---|
| 3,423,063 A | | 1/1969 | German | 251/149.6 |
| 3,589,673 A | * | 6/1971 | Cruse | 251/149.1 |
| 3,618,892 A | | 11/1971 | Sciuto, Jr. | 251/149.2 |
| RE27,364 E | | 5/1972 | German | 251/149.6 |
| 4,366,945 A | * | 1/1983 | Blauenstein | 251/149.6 |
| 4,494,608 A | * | 1/1985 | Williams et al. | 166/317 |
| 4,627,598 A | | 12/1986 | Fremy | 251/149.2 |
| 5,090,448 A | | 2/1992 | Truchet | 137/614.03 |
| 5,290,009 A | | 3/1994 | Heilmann | 251/149.6 |
| 5,607,139 A | | 3/1997 | Kjellberg | |
| 5,630,570 A | | 5/1997 | Lacroix et al. | 251/149.9 |
| 5,634,624 A | | 6/1997 | Lacroix et al. | 251/149.6 |
| 6,089,539 A | | 7/2000 | Kouda | 251/149.2 |
| 6,279,874 B1 | | 8/2001 | Nyberg | |

FOREIGN PATENT DOCUMENTS

| | | |
|---|---|---|
| DE | 11 15 998 B | 10/1961 |
| FR | 2 786 848 | 6/2000 |
| JP | 2001116178 A | 4/2001 |
| JP | 2001-146995 A | 5/2001 |

OTHER PUBLICATIONS

Copy of French Preliminary Report dated Jul. 7, 2004.

* cited by examiner

*Primary Examiner*—Paul J. Hirsch
(74) *Attorney, Agent, or Firm*—Dickstein, Shapiro, Morin & Oshinsky, LLP.

(57) ABSTRACT

There is disclosed a socket for a pipe coupling, comprising a hollow cylindrical socket body including a plug insertion port, a radially movable locking element to lock a plug in the plug insertion port, and a sleeve attached to the socket body so as to be movable forwards/backwards and can operate the locking element. A valve body including a channel hole and purge hole is fixed in the socket body, and a cylindrical seal member rotatable between a first position and a second position is attached between the socket body and valve body. The seal member opens the channel hole and closes the purge hole in the first position, and vice versa in the second position. The seal member is connected to a sleeve for valve opening/closing operation rotatably attached to the socket body by a connection pin inserted through a circumferential groove in the socket body.

7 Claims, 7 Drawing Sheets

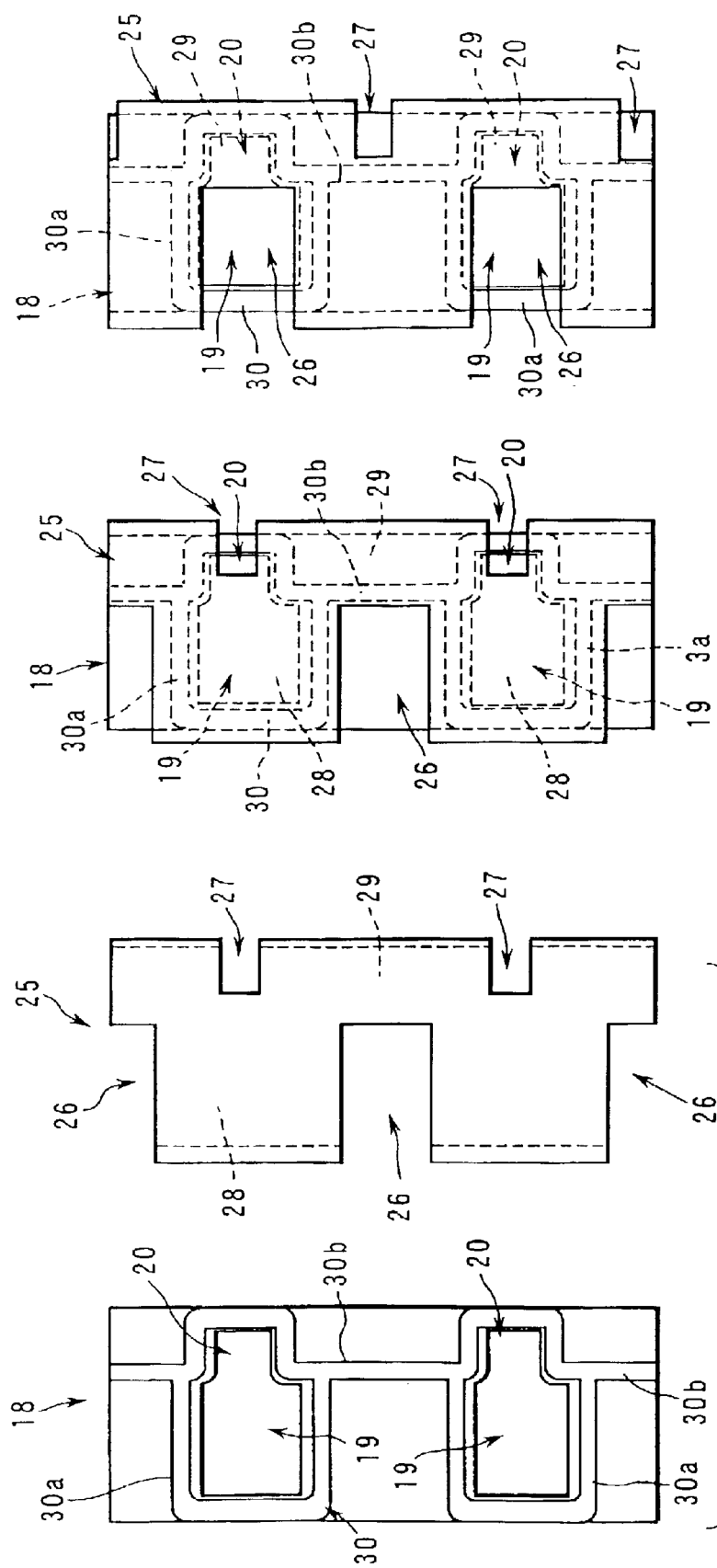

SOCKET FOR PIPE COUPLING

CROSS-REFERENCE TO RELATED APPLICATIONS

This application is based upon and claims the benefit of priority from the prior Japanese Patent Application No. 2002-036928, filed Feb. 14, 2002, the entire contents of which are incorporated herein by reference.

BACKGROUND OF THE INVENTION

1. Field of the Invention

The present invention relates to a socket for a pipe coupling with respect to which a plug can quickly and easily be connected/disconnected.

2. Description of the Related Art

A pipe coupling comprising a socket, including a valve, and a plug has heretofore been known. With this pipe coupling, since fluid pressure in the socket forms a large connection load in connecting the socket to the plug, it becomes difficult to connect the socket to the plug. Moreover, during disconnection of the socket from the plug, with fluid remaining in the plug, there is a possibility of the plug jumping out by the fluid pressure. A socket for a pipe coupling has been proposed so as to solve the problem and facilitate connection and disconnection of the socket to and from the plug.

This type of socket for the pipe coupling has been disclosed in which a ball valve is used as a valve disposed in the socket, and a sleeve for plug connection and a sleeve for valve opening/closing operation are fitted into the outer periphery of the socket main body (Jpn. Pat. Appln. KOKAI Publication No. 2001-116178). When the plug is disconnected, the sleeve for valve opening/closing operation is moved backwards. While the sleeve moves backwards, the valve closes, and the fluid in the plug is discharged to the outside. Furthermore, when the sleeve for valve opening/closing operation is moved backwards, the sleeve for plug connection accordingly moves backwards to perform an unlocking operation of the plug. Thereby, the plug can be disconnected from the socket for the pipe coupling.

According to the above-described socket for the pipe coupling, during the connection of the socket and plug, the socket and plug can be connected to each other without being influenced by the fluid pressure in the socket. Moreover, during the disconnection, the socket and plug can be disconnected after the fluid in the plug is discharged. Therefore, the socket and plug can easily be connected/disconnected. However, the structure is complicated, the number of components is large, and the manufacturing cost therefore is high. Furthermore, the valve is opened/closed by moving the sleeve for valve opening/closing forwards/backwards. Therefore, the entire constitution is lengthened and enlarged, and there has been a demand for improvements.

BRIEF SUMMARY OF THE INVENTION

An object of the present invention is to provide a socket for a pipe coupling whose structure is simplified to reduce costs and which can entirely be miniaturized.

To achieve the object, according to the present invention, there is provided a socket for a pipe coupling, comprising: a hollow cylindrical socket main body comprising a tip end in which a plug insertion port capable of receiving a plug including an engagement groove in an outer periphery is formed, a rear end in which a pipe connection portion attachable to a pipe to be connected to the plug is formed, and an inner peripheral surface which defines a fluid channel connecting the plug insertion port to the pipe connection portion and an inner space; at least one locking element which is supported in the tip end of the socket main body so as to be projected/retracted in a centripetal/centrifugal direction with respect to the socket main body and which can engage with the engagement groove when the plug is inserted into the plug insertion port; and a sleeve for plug connection which is attached to the outer periphery of the socket main body on a tip-end side and which can move forwards/backwards. This sleeve moves forwards to move the locking element toward the centripetal side and to lock the plug, and moves backwards so that the locking element can move toward the centrifugal side. This socket further includes a valve main body which is disposed in a concentric form at a predetermined interval from the inner peripheral surface of the socket main body and whose tip end is fixed to the socket main body. This valve main body comprises: a cylindrical member including a tip end in which a port fitted with the tip end of the plug is formed, closed rear end, and cylindrical wall which extends between the tip and rear ends to define the inner space; a channel hole formed in the cylindrical wall on a rear-end side; and a purge hole formed before the channel hole. This socket further includes a cylindrical seal member which is attached between the socket main body and valve main body so as to be rotatable between a first position and a second position distant from the first position and which seals between the socket main body and valve main body. This cylindrical seal member opens the channel hole and closes the purge hole in the first position to connect the inner space of the valve main body to the fluid channel on a rear side of the cylindrical seal member. The member closes the channel hole and opens the purge hole in the second position to connect the inner space of the valve main body to the inner space of the socket main body on the front side of the cylindrical seal member. This socket further includes a sleeve for valve opening/closing operation which is rotatably attached to the outer periphery of the socket main body, and a connection pin which integrally connects the sleeve for valve opening/closing operation to the cylindrical seal member. The socket main body includes a guide groove which is formed through the socket main body and which extends in a circumferential direction to guide the connection pin.

In the socket for the pipe coupling, the sleeve for valve opening/closing operation is rotated to rotate the cylindrical seal member via the connection pin, so that the opening/closing operation of the valve main body is possible. For non-connection of the plug, the channel hole is closed and the purge hole is kept in an open state. To connect the plug, the sleeve for plug connection is moved backwards from the state to insert the plug into the plug insertion port of the socket main body. At this time, since the plug is not influenced by the fluid pressure in the fluid channel of the socket main body, the plug can easily be inserted into and connected to the socket main body.

After the plug is connected, the sleeve for valve opening/closing operation is rotated to rotate the cylindrical seal member via the connection pin, and the channel hole of the valve main body is opened and the purge hole is closed to connect the fluid channel of the socket main body to the plug.

To disconnect the plug, first the sleeve for valve opening/closing operation is rotated to rotate the cylindrical seal member via the connection pin, the channel hole is closed, and the purge hole is opened. Thereby, in the socket main body, the inside of the valve main body and the fluid channel on the rear side of the cylindrical seal member are cut off, the purge hole is opened, and the valve main body is connected to the socket main body on the front side of the cylindrical seal member. The fluid remaining in the valve main body and plug is discharged to the outside, and the plug can easily and safely be disconnected from the socket main body. Moreover, the opening/closing operation of the valve main body is performed by rotating the sleeve for valve opening/closing operation, and therefore the whole constitution can be reduced in length and miniaturized as compared with a conventional constitution in which the sleeve for valve opening/closing operation is moved in axially. Moreover, since the constitution is not complicated and the number of components is small, the manufacturing is facilitated, and the cost can be reduced.

The guide groove usefully disposes the cylindrical seal member in the first position when the connection pin moves to one end of the guide groove, and disposes the member in the second position when the pin moves to the other end.

In this case, during the opening/closing operation of the valve main body, the sleeve for valve opening/closing is rotated until the connection pin abuts on either end of the guide groove, so that the opening/closing of the valve main body can be confirmed, and the opening/closing of the valve main body can be secured.

The sleeve for valve opening/closing operation is attached to the outer periphery of the socket main body at the predetermined interval in the concentric form. The sleeve for plug connection is attached between the sleeve for valve opening/closing operation and socket main body so as to be movable only in the axial direction, and the engagement groove which can engage with the connection pin is formed in the axial direction from the rear end. For the sleeve for plug connection, when the cylindrical seal member is in the first position, the rear end of the sleeve for plug connection abuts on the connection pin, and the sleeve is inhibited from moving backwards from a forward position. When the cylindrical seal member is in the second position, the engagement groove formed in the sleeve for plug connection receives the connection pin, and the sleeve can preferably move backwards from the forward position.

According to the constitution, during the non-connection of the plug, the sleeve for valve opening/closing operation disposes the cylindrical seal member in the second position via the connection pin, closes the channel hole of the valve main body, and opens the purge hole. At this time, the sleeve for plug connection moves backwards, and the engagement groove of the sleeve for plug connection engages with the connection pin. When the sleeve for valve opening/closing operation is rotated in this state, the connection pin is engaged with the sides of the engagement groove, and inhibited from rotating. Therefore, during the non-connection of the plug, it is impossible to rotate the sleeve for valve opening/closing operation or to open the channel hole of the valve main body.

To connect the plug, the plug is inserted into the socket main body disposed in the second position, the sleeve for plug connection is moved forwards, and the plug is locked and connected by the locking element, so that the connection pin disengages from the engagement groove. Thereby, when the sleeve for valve opening/closing operation is rotated, the cylindrical seal member is rotated in the first position via the connection pin, and the channel hole can be opened. Moreover, when the socket main body is disposed in the first position, and the sleeve for plug connection is moved backwards, the rear end of the sleeve for plug connection abuts the connection pin to inhibit the sleeve from moving backwards. Therefore, the plug cannot be disconnected. When the sleeve for plug connection is moved backwards to disconnect the plug, it is necessary to rotate the sleeve for valve opening/closing operation, close the channel hole of the valve main body, and open the purge hole. Therefore, security is high.

Furthermore, the socket for the pipe coupling includes a restricting pin which projects from the outer periphery of the socket main body and which engages with the engagement groove of the sleeve for plug connection. This restricting pin is preferably matched with the connection pin in the axial direction, when the cylindrical seal member is in the second position.

According to the constitution, when the sleeve for plug connection moves backwards in the closed state of the channel hole of the valve main body and the open state of the purge hole, the engagement groove formed in the sleeve for plug connection securely engages with the connection pin, and therefore the sleeve for plug connection can securely be moved backwards.

In the cylindrical seal member, a channel hole opening cutout groove which connects the inner space of the valve main body to the fluid channel via the channel hole of the valve main body is formed on the rear-end side. A purge hole opening cutout groove which connects the inner space of the valve main body to the inner space of the socket main body via the purge hole is formed on the tip-end side. The channel hole opening cutout groove and purge hole opening cutout groove are preferably formed so that positions of the grooves deviate from each other in a rotation direction so as to be prevented from overlapping in the axial direction.

According to the constitution, the channel hole and purge hole formed in the valve main body can easily and securely be opened/closed with a simple constitution.

Furthermore, the socket for the pipe coupling includes packing which is disposed in the outer peripheral surface of the valve main body to seal between the valve main body and the cylindrical seal member. This packing preferably includes: an enclosing portion which extends along a peripheral portion of the channel hole and purge hole connected to each other; and a connecting portion which extends in a peripheral direction from the enclosing portion to separate the channel hole opening cutout groove and purge hole opening cutout groove of the cylindrical seal member fitted into the outer periphery of the valve main body.

According to the constitution, the channel hole and purge hole formed in the valve main body can easily and securely be opened/closed with the simple constitution.

Furthermore, the socket for the pipe coupling includes a fixing sleeve which is fixed to the outer periphery of the socket main body on the rear-end side of the sleeve for valve opening/closing operation. This fixing sleeve includes a tip end fitted into the outer periphery of the rear end of the sleeve for valve opening/closing operation with play. At least one of the sleeve for valve opening/closing operation and the fixing sleeve is formed of a synthetic resin. A convex portion is formed in one of the tip end of the fixing sleeve and the rear end of the sleeve for valve opening/closing operation, and a concave portion into which the convex portion can engage is formed on the other. These convex and concave portions can be engaged/disengaged with respect to each other using elastic deformation of the resin, when the sleeve for valve opening/closing operation is rotated.

Additionally, these convex and concave portions preferably mesh with each other when the sleeve for valve opening/closing operation disposes the cylindrical seal member in the first and second positions.

According to the constitution, the sleeve for valve opening/closing operation reaches a rotated position in which the channel hole of the valve main body is opened and the purge hole is closed via the cylindrical seal member, or a rotated position in which the channel hole of the valve main body is closed and the purge hole is opened via the cylindrical seal member. At this time, an engagement convex portion formed in one of the inner peripheral surface of the fixing sleeve and the sleeve for valve opening/closing engages with an engagement concave portion formed in the other using the elastic deformation of the resin. Therefore, even if an adjoining apparatus hits the sleeve for valve opening/closing by mistake during the operation, the sleeve is not easily rotated, and safety of the operation is achieved.

BRIEF DESCRIPTION OF THE SEVERAL VIEWS OF THE DRAWING

FIGS. 4A to 4C show a relation of a channel hole and purge hole formed in the valve main body for use in the socket of FIG. 1, seal surface formed in a cylindrical seal, and channel hole opening cutout groove and purge hole opening cutout groove formed in the cylindrical seal member, FIG. 4A is a developed view of the valve main body and cylindrical seal member, FIG. 4B is a developed view showing that the cylindrical seal member closes the valve main body channel hole and opens the purge hole, and FIG. 4C is a developed view showing that the cylindrical seal member opens the valve main body channel hole and closes the purge hole;

DETAILED DESCRIPTION OF THE INVENTION

Figure 1:
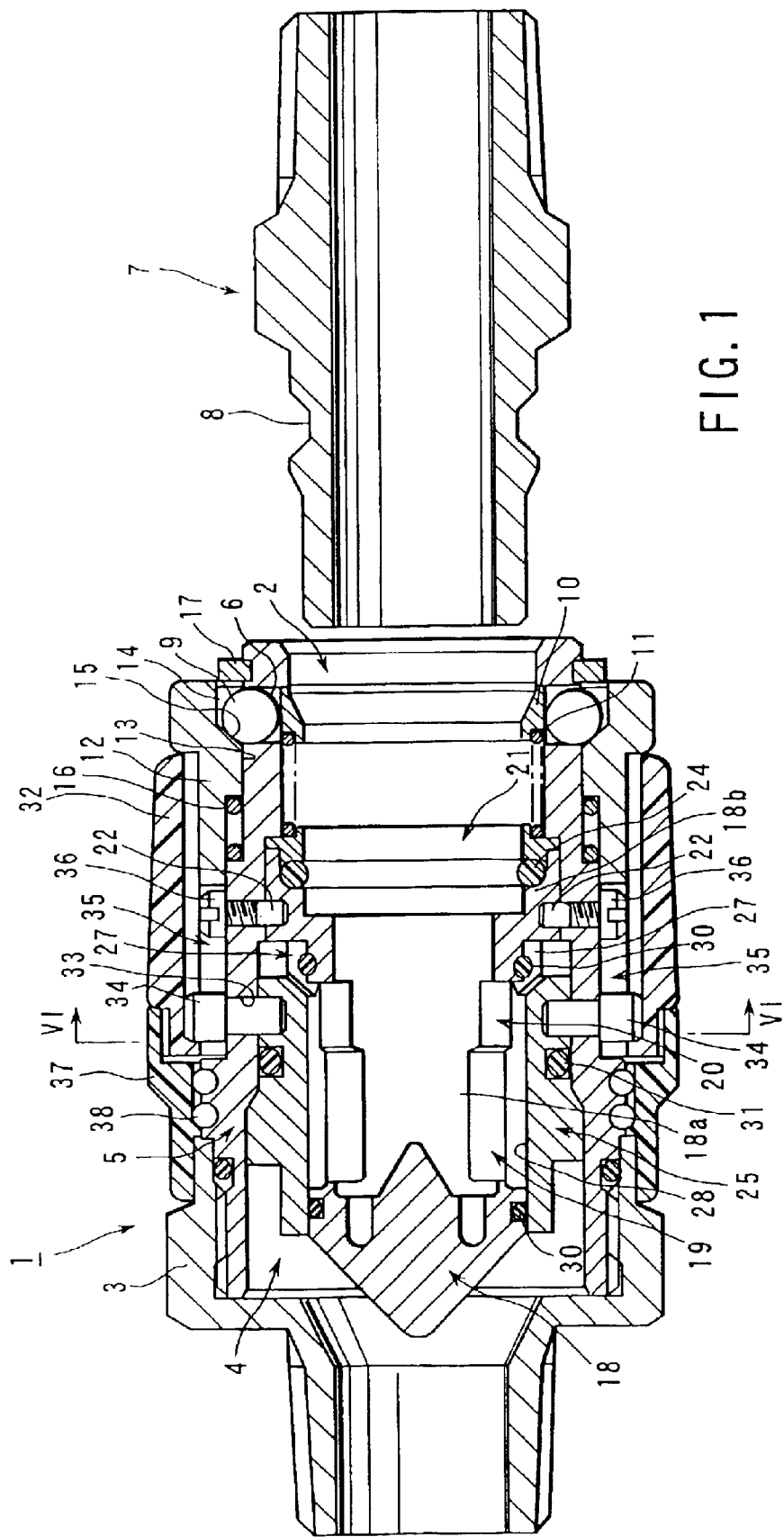
FIG. 1 is a longitudinal sectional view showing a preferred embodiment of a socket for a pipe coupling according to the present invention.

FIGS. 1 to 9 show a preferred embodiment of a socket for a pipe coupling according to the present invention. In the present embodiment, a socket for a pipe coupling 1 comprises a hollow cylindrical socket main body 5 including: a plug insertion port 2 formed in a tip end; a fluid channel 4 formed inside the body; and a piping connection portion 3 in a rear end. In the tip end of the socket main body 5, a plurality of holes 6 are formed along a peripheral direction. A locking element 9 engaged with an engagement groove 8 formed in the outer periphery of a plug 7 to lock the plug 7 is fitted into each hole 6 so that the portion can be projected/retracted in a centripetal/centrifugal direction. This locking element 9 is formed by a lock ball, but is not limited to the ball, and a lock claw or pin may also be used.

A collar 10 for supporting the locking element 9 so as to prevent the portion from projecting into the inner periphery of the socket main body 5 is slidably fitted into the inner periphery of the socket main body 5 on the tip-end side. This collar 10 is urged in a tip-end direction by a spring 11. When the plug 7 is connected, the collar is pushed by the plug 7 to move backwards against a snapping force of the spring 11, and disengaged from the locking element 9. Then, the locking element 9 can project into the socket main body 5.

In the outer periphery of the socket main body 5 on the tip-end side, a sleeve for plug connection 12 is fitted so as to be slidable only in an axial direction, as described later. The sleeve moves forwards, thereby moves the locking element 9 on a centripetal side so that the portion engages with the engagement groove 8 of the plug 7, and locks the plug 7. The sleeve moves backwards so that the locking element 9 can move on a centrifugal side, and unlocks the plug 7.

A small-diameter locking element inhibiting surface 13 for pressing the locking element 9 in a centripetal direction is formed in the inner periphery of the tip end of the sleeve for plug connection 12. A large-diameter release concave portion 14 for releasing the inhibition of the locking element 9 is formed on the tip-end side. Moreover, a slant surface 15 is formed in a side wall of the release concave portion 14 to press/move the locking element 9 in the centripetal direction when moving forwards on the tip-end side of the sleeve for plug connection 12.

A spring 16 for urging the sleeve for plug connection 12 in a forward direction is disposed between the socket main body 5 and sleeve for plug connection 12. Moreover, a stop ring 17 for preventing the sleeve for plug connection 12 from coming off is attached to the outer peripheral tip end of the socket main body 5.

A valve main body 18 is secured in the socket main body 5. The body 18 is cylindrical member and comprises a rear, small-diameter portion 18a and a front, large-diameter portion 18b. The small-diameter portion 18a is closed at the rear and has a channel hole 19 and a purge hole 20. The purge hole 20 is located in front of the channel hole 19. The large-diameter portion 18b has an engagement port 21, in which the tip of the plug 7 is fitted.

In the socket main body 5, the valve main body 18 lies coaxial with the body 5. The small-diameter portion 18a is positioned, with a prescribed gap between it and the inner circumferential surface of the socket main body 5. The portion 18a is fastened to the body 5 by fixing pins 22.

Figure 2A:
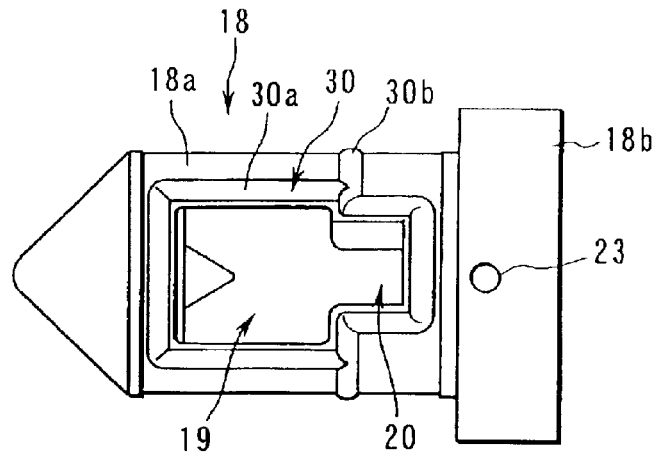
FIG. 2A is a plan view of a valve main body for use in the socket of FIG. 1.
Figure 2B:
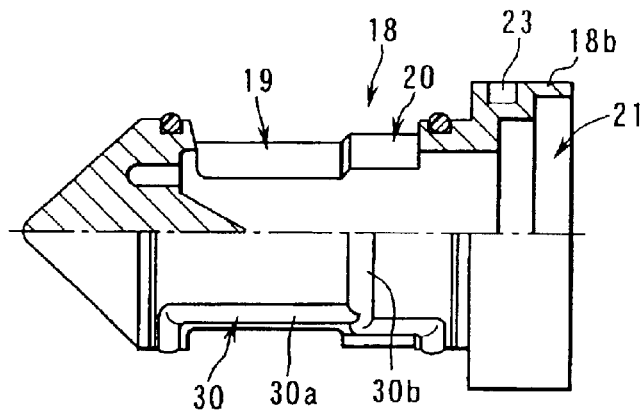
FIG. 2B is a plan view showing a longitudinal section of a part of FIG. 2A.

The channel hole 19 and purge hole 20 are made in the circumferential wall of the small-diameter portion 18a. They are spaced apart by 180 along the circumference of the portion 18a as shown in FIG. 2. One hole may replace the holes 19 and 20, as is illustrated in FIG. 2.

The socket main body 5 has holes 23, in which the fixing pins 22 are inserted. A seal ring 24 is attached to the inner circumferential surface of the large-diameter portion 18b. The seal ring fills the gap between the plug 7 and the large-diameter portion 18b.

A cylindrical seal member 25 for sealing between the socket main body 5 and valve main body 18 is rotatably fitted between the socket main body 5 and valve main body 18. When the cylindrical seal member 25 is in a predetermined position in the rotation direction, the cylindrical seal member 25 opens the channel hole 19, connects the inside of the valve main body 18 to the fluid channel 4 on the rear side of the cylindrical seal member 25, and closes the purge hole 20. When the member is in a position rotated from the above-described position by a predetermined amount, the member closes the channel hole 19, opens the purge hole 20, and connects the inside of the valve main body 18 to the inside of the socket main body 5 on the front side of the cylindrical seal member 25.

Figure 3A:
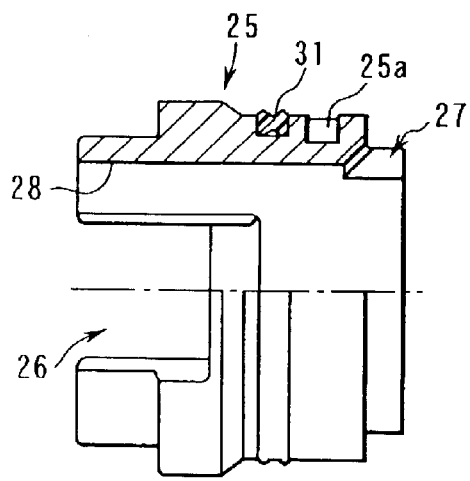
FIG. 3A is a front view showing a longitudinal section of a part of a cylindrical seal member fitted between the valve main body and socket main body in the socket of FIG. 1.
Figure 3B:
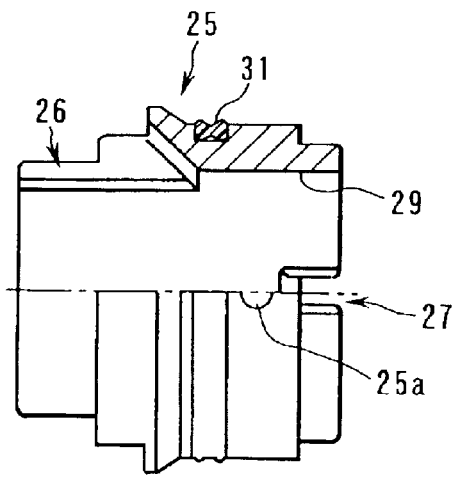
FIG. 3B is a plan view showing a transverse section of a part of the cylindrical seal member of FIG. 3B.

In the present embodiment, as shown in FIGS. 3A, 3B, in the cylindrical seal member 25, a channel hole opening cutout groove 26 for opening the channel hole 19 disposed in the valve main body 18 is formed on the rear-end side. A purge hole opening cutout groove 27 for opening the purge hole 20 disposed in the valve main body 18 on the tip-end side is formed. The channel hole opening cutout groove 26 and purge hole opening cutout groove 27 are formed in positions deviating from each other by about 90 degrees in the rotation direction so as to prevent the grooves from overlapping with each other in the axial direction. Moreover, in the cylindrical seal member 25, two channel hole opening cutout grooves 26 are formed opposite to two channel holes 19 disposed in positions deviating from each other by 180 degrees in the circumferential direction in the cylindrical wall of the small-diameter cylindrical portion 18a of the valve main body 18. Two purge hole opening cutout groove 27 are also similarly disposed opposite to two purge holes 20. The inner peripheral surface of the cylindrical seal member 25 between two channel hole opening cutout grooves 26 forms a channel hole closing surface 28, and the inner peripheral surface between two purge hole opening cutout grooves 27 forms a purge hole closing surface 29.

A relation of the valve main body 18 and cylindrical seal member 25 will be described in more detail. As shown in FIGS. 4A to 4C, packing 30 is disposed in the outer peripheral surface of the valve main body 18 to seal between the inner peripheral surface of the cylindrical seal member 25 and the channel hole closing surface 28 and purge hole closing surface 29. Each packing 30 includes an enclosing portion 30a with which the channel hole 19 and purge hole 20 are enclosed, and connecting portion 30b for connecting the enclosing portions. The connecting portion 30b extends in the circumferential direction from one side of the enclosing portion 30a to partition the cylindrical seal member 25 fitted into the outer periphery of the valve main body 18 between the channel hole opening cutout groove 26 and purge hole opening cutout groove 27, that is, between the channel hole closing surface 28 and purge hole closing surface 29.

Next, the opening/closing of the channel hole 19 and purge hole 20 of the valve main body 18 by the cylindrical seal member 25 will be described. As shown in FIG. 4B, when the channel hole closing surface 28 of the cylindrical seal member 25 is positioned to overlap with the channel hole 19 of the valve main body 18, the purge hole 20 is overlapped with the purge hole opening cutout groove 27. The enclosing portion 30a of the packing 30 seals between the packing and the channel hole closing surface 28 of the cylindrical seal member 25. Moreover, the connecting portion 30b seals between the channel hole closing surface 28 and purge hole closing surface 29 in the circumferential direction. Thereby, the channel hole 19 is closed, the purge hole 20 is opened by the purge hole opening cutout groove 27, and the inside of the valve main body 18 is connected to the inside of the socket main body 5 on the front side of the cylindrical seal member 25.

Moreover, as shown in FIG. 4C, when the cylindrical seal member 25 rotates from the position by 90 degrees, the channel hole opening cutout groove 26 of the cylindrical seal member 25 overlaps with the channel hole 19 of the valve main body 18. The purge hole 20 is overlapped with the purge hole closing surface 29, and the enclosing portion 30a of the packing 30 seals between the packing and the purge hole closing surface 29 of the cylindrical seal member 25. Furthermore, the connecting portion 30b seals between the channel hole closing surface 28 and purge hole closing surface 29 in the circumferential direction. Thereby, the purge hole 20 is closed, the channel hole 19 is opened, and the inside of the valve main body 18 is connected to the fluid channel 4 on the rear side of the cylindrical seal member 25.

The packing 30 is directly bonded to the outer peripheral surface of the valve main body 18 in the present embodiment, but a protrusion is formed opposite to the packing 30 in the outer peripheral surface of a rubber cylindrical member. This rubber cylindrical member may be attached to the outer periphery of the valve main body 18, so that the packing 30 is disposed on the outer peripheral surface of the valve main body 18.

As shown in FIGS. 3A, 3B, a seal ring 31 for sealing between the outer periphery of the cylindrical seal member 25 and the inner periphery of the socket main body 5 is attached to the outer periphery of the cylindrical seal member 25. Moreover, a connection pin insertion hole 25a into which a connection pin described later is to be inserted is formed in the outer periphery of the cylindrical seal member 25.

Figure 5:
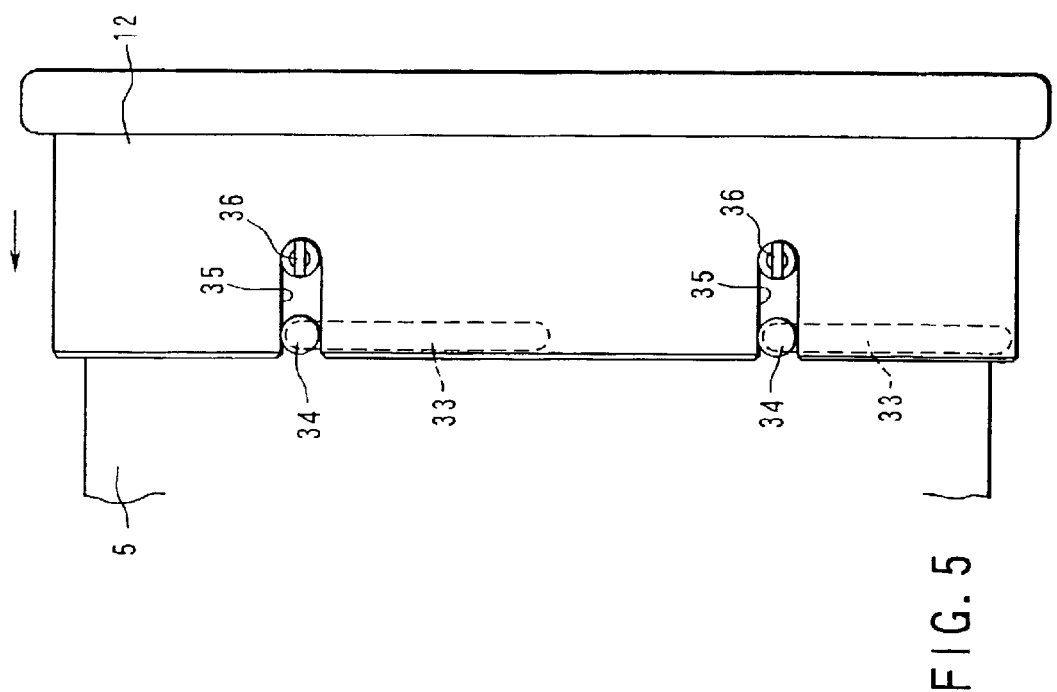
FIG. 5 is a developed view showing a relation between an engagement groove formed in a sleeve for plug connection and a connection pin for rotating the cylindrical seal member in the state of FIG. 1.
Figure 9:
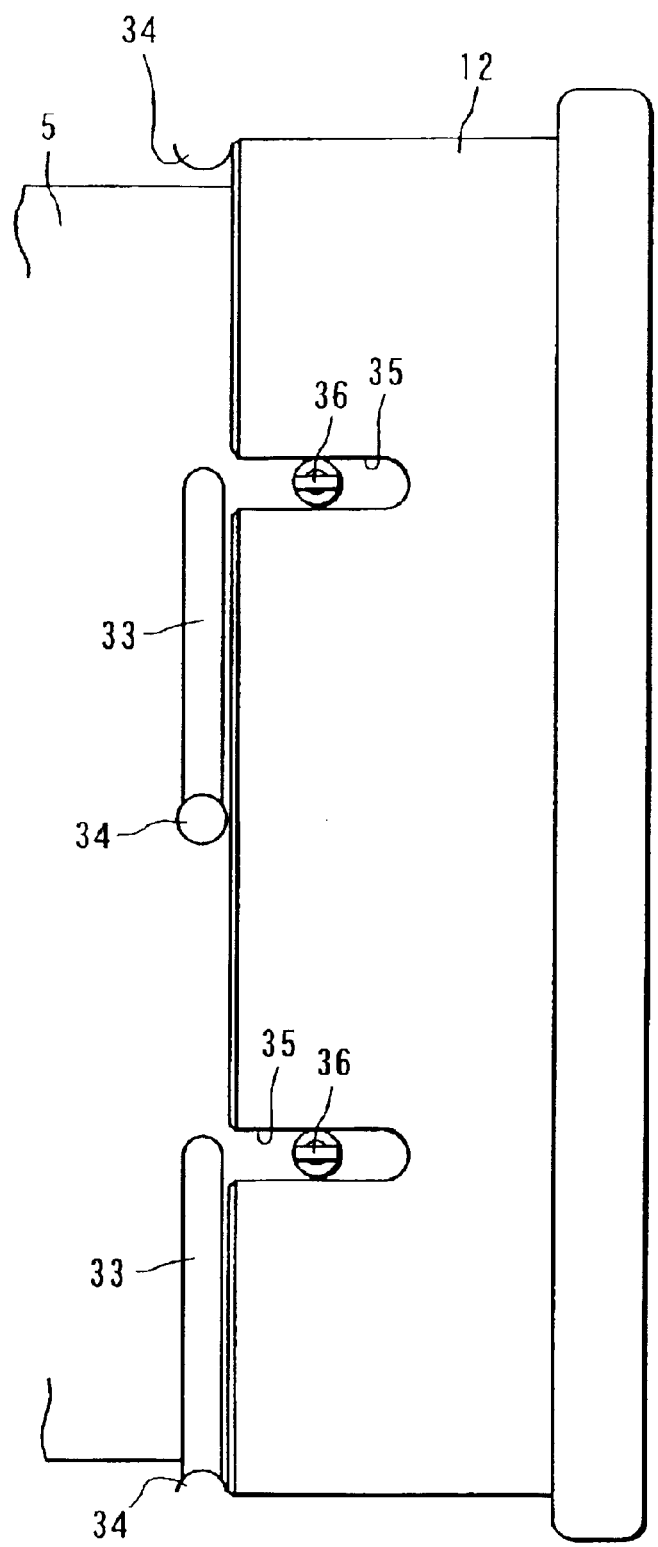
FIG. 9 is a developed view showing a relation between the engagement groove formed in the sleeve for plug connection and the connection pin for rotating the cylindrical seal member in the state of FIG. 8.

The rotation operation of the cylindrical seal member 25 is performed by a sleeve for valve opening/closing operation 32 which is rotatably fitted into the outer periphery of the socket main body 5. That is, as shown in FIGS. 5, 9, a guide groove 33 is formed in the circumferential direction in the socket main body 5. The cylindrical seal member 25 and sleeve for valve opening/closing operation 32 are integrally connected to each other (FIG. 1) by a connection pin 34 which is movably passed through the guide groove 33. When the sleeve for valve opening/closing operation 32 is rotated, the cylindrical seal member 25 is rotated via the connection pin 34, and the opening/closing operation of the valve main body 18 can be performed.

For the guide groove 33 formed in the circumferential direction in the socket main body 5, when the sleeve for valve opening/closing operation 32 is rotated, and the connection pin 34 moves to one end of the guide groove 33, the cylindrical seal member 25 opens the channel hole 19 of the valve main body 18, and closes the purge hole 20. When the connection pin 34 moves to the other end of the guide groove 33, the cylindrical seal member 25 closes the channel hole 19 of the valve main body 18, and opens the purge hole 20. The guide groove is formed in a length sufficient to realize this. In this case, during the opening/closing operation of the valve main body 18, the sleeve for valve opening/closing operation 32 is rotated until the connection pin 34 abuts on any end of the guide groove 33. Thereby, the opening/closing of the valve main body 18 can be confirmed, and the valve main body 18 can securely be opened/closed.

The sleeve for valve opening/closing operation 32 fitted into the outer periphery of the socket main body 5 is fitted into the outer periphery of the socket main body 5 at the predetermined interval in the concentric form. On the other hand, the rear portion of the sleeve for plug connection 12 is movably fitted between the socket main body 5 and sleeve for valve opening/closing operation 32 so as to be movable only in the axial direction.

Moreover, in the sleeve for plug connection 12, an engagement groove 35 which can be engaged with the connection pin 34 for connecting the sleeve for valve opening/closing operation 32 to the cylindrical seal member 25 is formed in the axial direction from the rear end. The cylindrical seal member 25 is in the rotated position in which the channel hole 19 is opened and the purge hole 20 is closed. Then, the rear end of the sleeve for plug connection 12 in the forward position abuts the connection pin 34 and is stopped from moving backwards (FIG. 9). In the rotated position in which the cylindrical seal member 25 closes the channel hole 19 and opens the purge hole 20, the connection pin 34 engages with the engagement groove 35 formed in the sleeve for plug connection 12, and the sleeve for plug connection 12 in the forward position can move backwards (FIG. 5).

Furthermore, in the outer periphery of the socket main body 5, a restricting pin 36 is disposed to engage with the engagement groove 35 formed in the sleeve for plug connection 12 and to restrict the rotation of the sleeve 12 so that the sleeve can move only in the axial direction. The restricting pin projects in a position which agrees in the axial direction with a position of the connection pin 34 in which the restricting pin closes the channel hole 19 of the valve main body 18 and opens the purge hole 20. In the present embodiment, for the restricting pin 36, the fixing pin 22 for fixing the valve main body 18 onto the socket main body 5 is projected from the outer periphery of the socket main body 5 to form the restricting pin 36.

Figure 6:
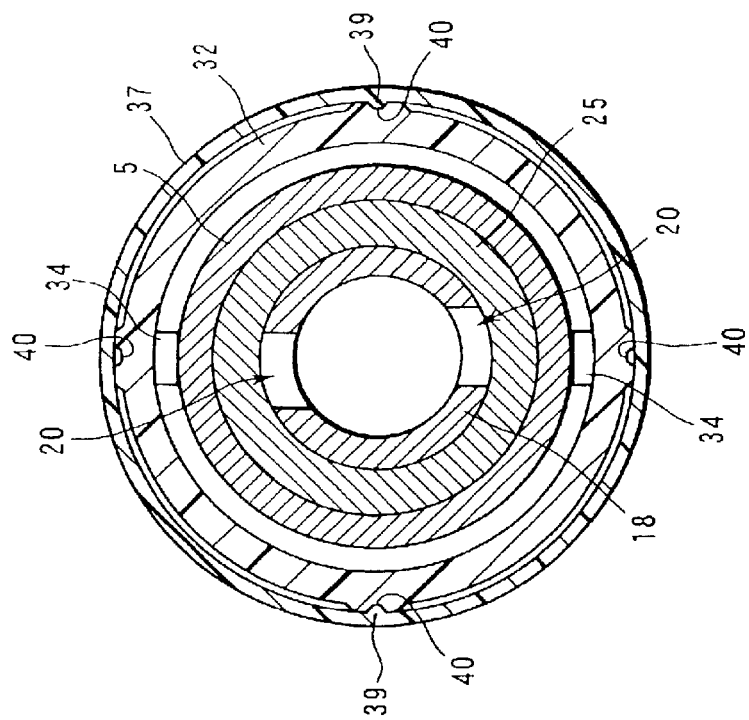
FIG. 6 is a sectional view along line VI—VI of FIG. 1.

Additionally, in the outer periphery of the socket main body 5, a fixing sleeve 37 is fitted on the rear-end side of the sleeve for valve opening/closing operation 32, and fixed while stopped from rotating by a key 38. On the tip-end side, the fixing sleeve 37 is fitted with play into the outer periphery of the rear end of the sleeve for valve opening/closing operation 32, and at least one of the sleeve for valve opening/closing operation 32 and fixing sleeve 37 is formed of a synthetic resin. Moreover, as shown in FIG. 6, an engagement convex portion 39 is formed in one of the inner peripheral surface of the fixing sleeve 37 and the outer peripheral surface of the sleeve for valve opening/closing operation 32. An engagement concave portion 40 is formed in the other. When the sleeve for valve opening/closing operation 32 rotates, the engagement convex portion 39 uses the elastic deformation of the resin to be engaged/disengaged with respect to the engagement concave portion 40. Furthermore, the engagement convex portion 39 and engagement concave portion 40 are formed in engaging portions, when the sleeve for valve opening/closing operation 32 reaches rotated positions. In the positions, the channel hole 19 of the valve main body 18 is opened and the purge hole 20 is closed via the cylindrical seal member 25, and the channel hole 19 of the valve main body 18 is closed and the purge hole 20 is opened via the cylindrical seal member 25.

In the present embodiment, the sleeve for valve opening/closing operation 32 and fixing sleeve 37 are both formed of the synthetic resin. Moreover, the engagement convex portion 39 is formed in the inner peripheral surface of the fixing sleeve 37, and the engagement concave portion 40 is formed in the outer peripheral surface of the sleeve for valve opening/closing operation 32 (FIG. 6).

Next, a connection/disconnection operation of the socket for the pipe coupling 1 and plug 7 will be described.

The socket for the pipe coupling 1 to which the plug 7 is not connected is disposed in the rotated position in which the sleeve for valve opening/closing operation 32 allows the cylindrical seal member 25 to close the channel hole 19 of the valve main body 18 and open the purge hole 20 via the connection pin 34. The locking element 9 is supported by the collar 10 which is urged by the spring 11 to move forwards on the centrifugal side. The engagement groove 35 engages with the connection pin 34 and the sleeve for plug connection 12 in a backward position abuts the locking element 9 and is stopped from moving forwards while the slant surface 15 is on the centrifugal side.

Moreover, when the sleeve for valve opening/closing operation 32 is rotated from this state, the connection pin 34 engaged with the engagement groove 35 of the sleeve for plug connection 12 engages with the side of the engagement groove 35 and is stopped from rotating. Therefore, during the non-connection of the plug 7, it is impossible to rotate the sleeve for valve opening/closing operation 32 or to open the channel hole 19 of the valve main body 18 (FIG. 1).

In this state, the plug 7 is inserted into the plug insertion port 2, and the collar 10 is pushed by the tip end of the plug 7 to move backwards and to release the support of the locking element 9 on the centrifugal side. Furthermore, when the plug 7 is inserted, and the engagement groove 8 formed in the outer periphery of the plug 7 reaches the position of the locking element 9, the locking element 9 moves on the centripetal side to engage with the engagement groove 8. Thereby, the sleeve for plug connection 12 stopped from moving forwards is released from the locking element 9, and urged by the spring 16 to move forwards. The locking element inhibiting surface 13 disposed on the inner peripheral surface of the sleeve presses the locking element 9 engaged with the engagement groove 8 and the portion is stopped from moving on the centrifugal side. Thereby, the socket for the pipe coupling 1 is connected to the plug 7.

Figure 7:
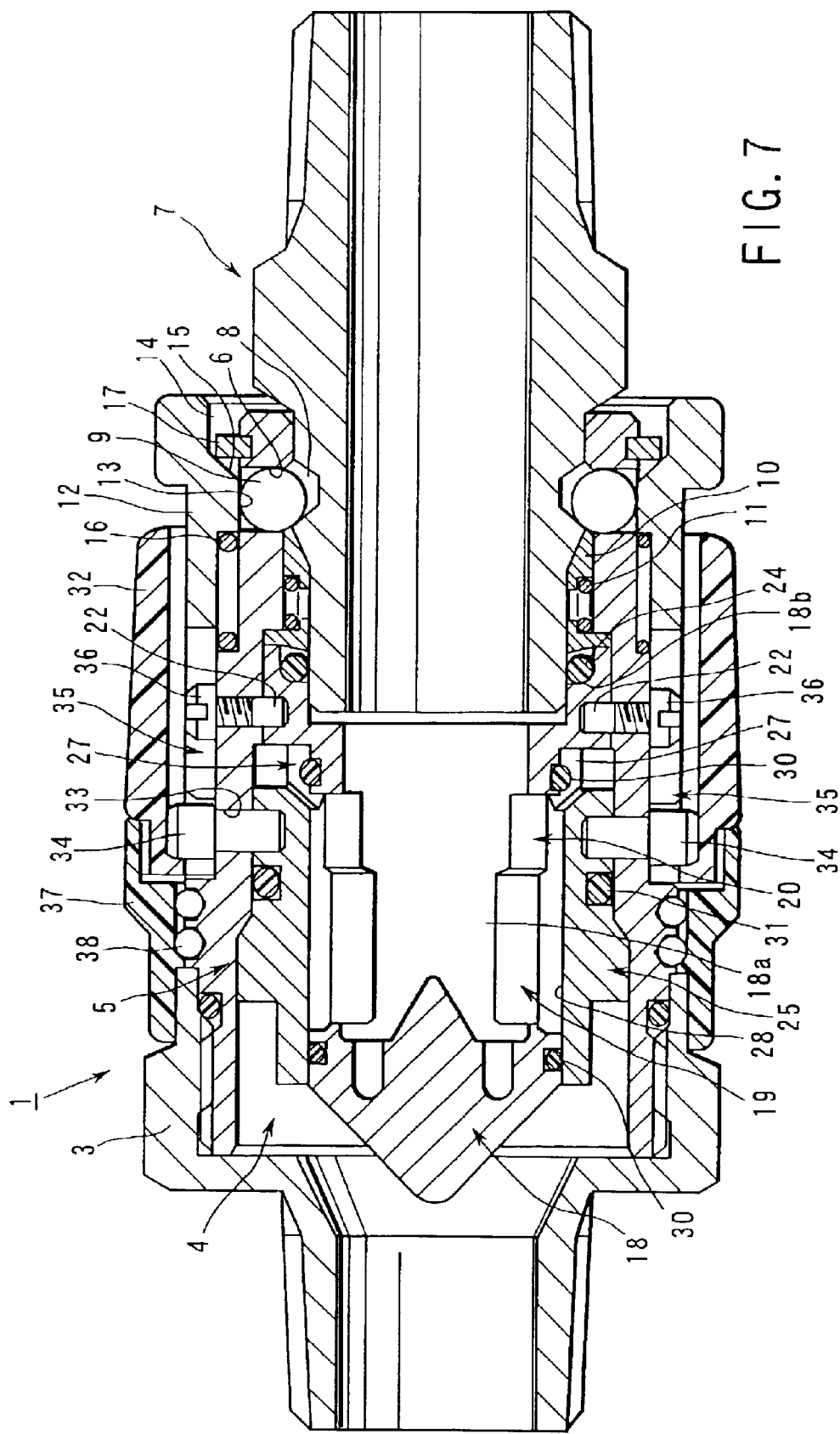
FIG. 7 is a longitudinal sectional view showing that a plug is connected to the socket shown in FIG. 1.

Moreover, when the plug 7 is inserted into the plug insertion port 2 of the socket main body 5, the plug 7 is not influenced by the fluid pressure in the fluid channel 4 of the socket main body 5. Therefore, the plug can easily be inserted into and connected to the socket main body 5 (FIG. 7). When the sleeve for plug connection 12 moves forwards as described above, the connection pin 34 disengages from the engagement groove 35, and the sleeve for valve opening/closing operation 32 can rotate.

Figure 8:
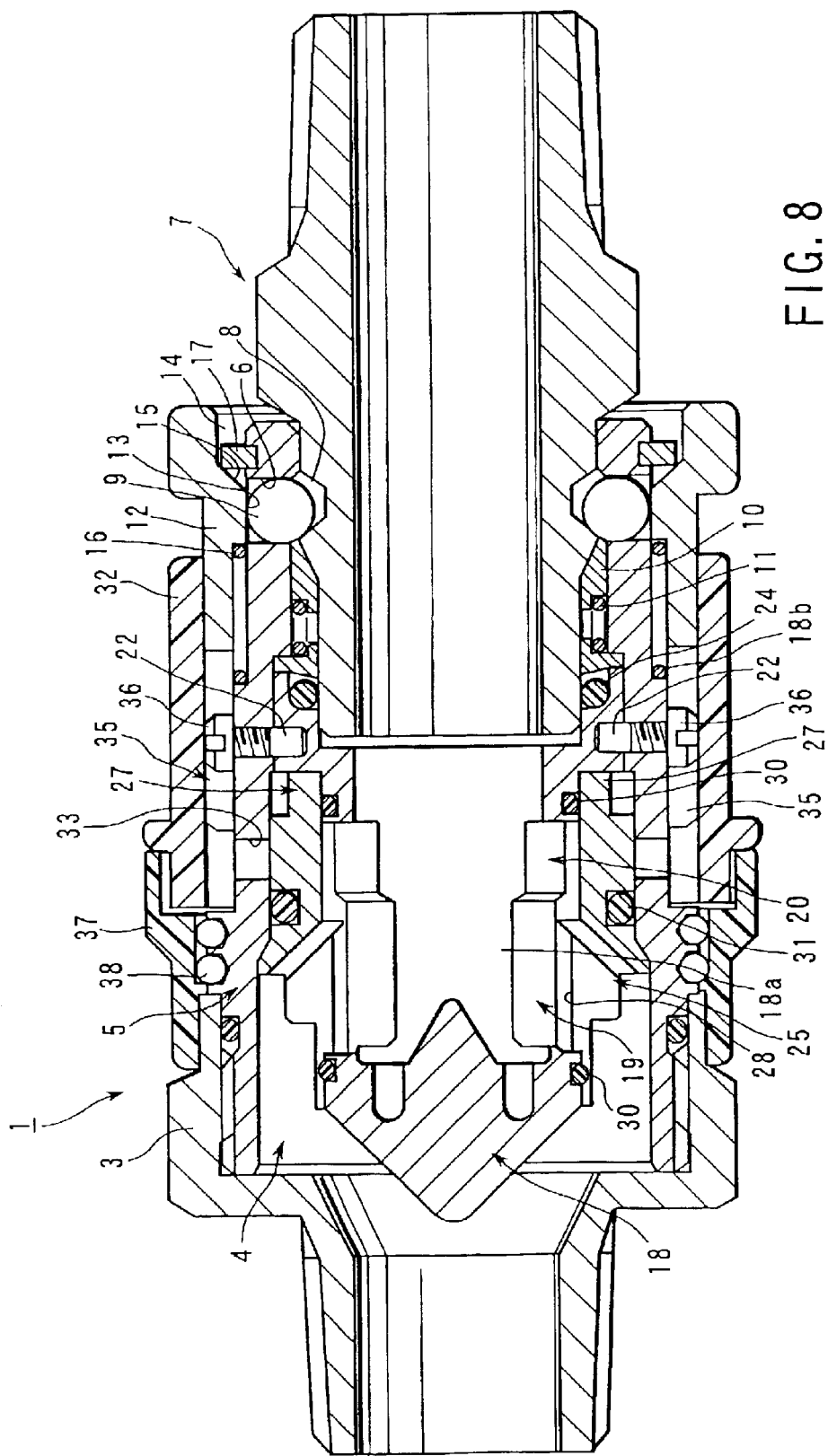
FIG. 8 is a longitudinal sectional view showing that the plug is connected to the socket shown in FIG. 1, a sleeve for valve opening/closing operation is rotated, and the channel hole of the valve main body is opened.

The plug 7 is connected to the socket main body 5 in this manner, and the sleeve for valve opening/closing operation 32 which can now rotate is rotated to rotate the cylindrical seal member 25 via the connection pin 34. Then, the channel hole 19 of the valve main body 18 is opened and the purge hole 20 is closed, so that the fluid channel 4 of the socket main body 5 is connected to the plug 7 (FIG. 8).

At this time, the sleeve for valve opening/closing operation 32 can rotate until the connection pin 34 abuts the end of the guide groove 33. Therefore, by this abutment, it can be confirmed that the channel hole 19 of the valve main body 18 is opened and the purge hole 20 is closed. Moreover, the opening of the channel hole 19 of the valve main body 18 and the closing of the purge hole 20 can be secured.

Furthermore, when the sleeve for plug connection 12 is moved backwards from this state, the rear end of the sleeve for plug connection 12 abuts the connection pin 34 disengaged from the engagement groove 35 and the sleeve is prevented from moving backwards (FIG. 9). Therefore, when the channel hole 19 of the valve main body 18 is opened, the plug 7 cannot be disengaged, and this is high in security.

Moreover, at this time, the engagement concave portion 40 uses the elastic deformation of the resin to engage with the outer peripheral surface of the sleeve for valve opening/closing operation 32, and the engagement convex portion 39 also uses the deformation to engage with the inner peripheral surface of the fixing sleeve 37. Therefore, even if an adjoining apparatus hits the sleeve for valve opening/closing operation by mistake during the operation, the sleeve is not easily rotated, and safety of the operation is achieved.

To disconnect the socket for the pipe coupling 1 and plug 7 connected in this manner from each other, first the sleeve for valve opening/closing operation 32 is rotated in a direction opposite to the direction of the above-described rotation, the cylindrical seal member 25 is rotated via the connection pin 34, the channel hole 19 of the valve main body 18 is closed, and the purge hole 20 is opened.

Thereby, in the socket main body 5, the inside of the valve main body 18 and the fluid channel 4 on the rear side of the cylindrical seal member 25 are cut off. Moreover, the purge hole 20 is opened, and the inside of the valve main body 18 is connected to the inside of the socket main body 5 on the front side of the cylindrical seal member 25. Then, the fluid remaining in the valve main body 18 and plug 7 is discharged to the outside via a gap of the socket main body 5 on the front side of the cylindrical seal member 25.

At this time, the sleeve for valve opening/closing operation 32 can also rotate until the connection pin 34 abuts the other end of the guide groove 33. Therefore, by this abutment, it can be confirmed that the channel hole 19 of the valve main body 18 is closed and the purge hole 20 is opened. Moreover, the closing of the channel hole 19 of the valve main body 18 and the opening of the purge hole 20 can be secured.

Next, to unlock the plug 7 locked by the locking element 9, the sleeve for plug connection 12 is moved backwards. At this time, since the connection pin 34 and restricting pin 36 engage with the engagement groove 35 formed in the sleeve for plug connection 12, the sleeve for plug connection 12 is restricted by the restricting pin 36 to move only in the axial direction. Thereby, since the connection pin 34 securely engages with the engagement groove 35 formed in the sleeve for plug connection 12, the sleeve for plug connection 12 can securely be moved backwards.

When the sleeve for plug connection 12 is moved backwards, the locking element 9 is positioned on a release concave portion 14 to release the pressing by the locking element inhibiting surface 13, and the plug 7 is pulled out of this state. In the process of the extracting of the plug 7, first the locking element 9 disengaged from the engagement groove 8 is pushed toward the centrifugal side from the outer periphery of the plug 7 to move, enters the release concave portion 14 of the sleeve for plug connection 12 moved backwards, and engages with the slant surface 15.

Furthermore, when the plug 7 is extracted, the collar 10 moved backwards as described above with the extracting of the plug 7 is urged by the spring 11 to move forwards, and supports the locking element 9 which has moved in a centrifugal direction. Thereby, the sleeve for plug connection 12 moved backwards is held in a backward position, and the plug 7 is in a connection waiting state.

As described above, the socket for the pipe coupling 1 is separated from the plug 7. However, prior to the separating of the socket for the pipe coupling 1 from the plug 7, the fluid remaining in the valve main body 18 and plug 7 is discharged to the outside, so that the plug 7 can easily and safely be extracted and disconnected from the socket main body 5.

What is claimed is:

1. A socket for a pipe coupling, comprising:

a hollow cylindrical socket main body comprising a tip end in which a plug insertion port capable of receiving a plug including an engagement groove in an outer periphery of the plug is formed, a rear end in which a piping connection portion attachable to a piping to be connected to the plug is formed, and an inner peripheral surface which defines a fluid channel connecting the plug insertion port to the piping connection portion and an inner space;

at least one locking element which is supported in the tip end of the socket main body so as to be projected/retracted in a centripetal/centrifugal direction with respect to the socket main body and which can engage with the engagement groove, when the plug is inserted into the plug insertion port;

a sleeve for plug connection which is attached to the outer periphery on a tip-end side of the socket main body and which can move forwards/backwards and which moves forwards to move the locking element toward a centripetal side and to lock the plug and which moves backwards so that the locking element can move toward a centrifugal side;

a valve main body which is disposed in a concentric form at a predetermined interval from the inner peripheral surface of the socket main body and whose tip end is fixed to the socket main body and which comprises a cylindrical member including a tip end provided with a port fitted into the tip end of the plug, a closed rear end, and cylindrical wall extending between the tip and rear ends to define the inner space, a channel hole formed in the cylindrical wall on a rear-end side, and a purge hole formed before the channel hole;

a cylindrical seal member which is attached between the socket main body and valve main body so as to be rotatable between a first position and a second position distant from the first position and which seals between the socket main body and valve main body and which opens the channel hole and closes the purge hole in the first position to connect the inner space of the valve main body to the fluid channel on a rear side of the cylindrical seal member and which closes the channel hole and opens the purge hole in the second position to connect the inner space of the valve main body to the inner space of the socket main body on a front side of the cylindrical seal member;

a sleeve for valve opening/closing operation which is rotatably attached to the outer periphery of the socket main body; and a connection pin which integrally connects the sleeve for valve opening/closing operation to the cylindrical seal member, the socket main body having a guide groove which is formed through the socket main body and which extends in a circumferential direction to guide the connection pin.

2. A socket for the pipe coupling according to claim 1, wherein the guide groove disposes the cylindrical seal member in the first position, when the connection pin moves to one end of the guide groove, and disposes the cylindrical seal member in the second position, when the pin moves to the other end.

3. A socket for the pipe coupling according to claim 1, wherein the sleeve for valve opening/closing operation is attached to the outer periphery of the socket main body at the predetermined interval in the concentric form, the sleeve for plug connection is attached between the sleeve for valve opening/closing operation and socket main body so as to be movable only in the axial direction, and the engagement groove which can engage with the connection pin is formed in the axial direction from the rear end, and the rear end of the sleeve for plug connection abuts the connection pin and the sleeve for plug connection is inhibited from moving backwards from a forward position, when the cylindrical seal member is in the first position, and the engagement groove formed in the sleeve for plug connection receives the connection pin and the sleeve for plug connection can move backwards from the forward position, when the cylindrical seal member is in the second position.

4. A socket for the pipe coupling according to claim 3, further comprising:

a restricting pin which projects from the outer periphery of the socket main body and which engages with the engagement groove of the sleeve for plug connection and which is matched with the connection pin in the axial direction, when the cylindrical seal member is in the second position.

5. A socket for the pipe coupling according to claim 1, wherein a channel hole opening cutout groove which connects the inner space of the valve main body to the fluid channel via the channel hole of the valve main body is formed on the rear-end side of the cylindrical seal member, a purge hole opening cutout groove which connects the inner space of the valve main body to the inner space of the socket main body via the purge hole is formed on the tip-end side of the seal member, and these channel hole opening cutout groove and purge hole opening cutout groove are formed so that positions of the grooves deviate from each other in a rotation direction so as to be prevented from overlapping in the axial direction.

6. A socket for the pipe coupling according to claim 5, further comprising:

packing which is disposed in the outer peripheral surface of the valve main body to seal between the valve main body and the cylindrical seal member and which comprises an enclosing portion extending along a peripheral portion of the channel hole and purge hole connected to each other, and a connecting portion extending in a peripheral direction from the enclosing portion to separate the channel hole opening cutout groove and purge hole opening cutout groove of the cylindrical seal member fitted into the outer periphery of the valve main body.

7. A socket for the pipe coupling according to claim 1, further comprising: a fixing sleeve which is fixed to the outer periphery of the socket main body on the rear-end side of the sleeve for valve opening/closing operation and which comprises a tip end fitted into the outer periphery of the rear end of the sleeve for valve opening/closing operation with a play, wherein at least one of the sleeve for valve opening/closing operation and the fixing sleeve is formed of a synthetic resin, a convex portion is formed in one of the tip end of the fixing sleeve and the rear end of the sleeve for valve opening/ closing operation, a concave portion with which the convex portion can engage is formed in the other, the convex portion and concave portion can be engaged/disengaged with respect to each other using elastic deformation of the resin, when the sleeve for valve opening/closing operation is rotated, and these convex and concave portions mesh with each other, when the sleeve for valve opening/closing operation disposes the cylindrical seal member in the first and second positions.

\* \* \* \* \*